(12) United States Patent
Zhang et al.

(10) Patent No.: US 10,905,111 B2
(45) Date of Patent: Feb. 2, 2021

(54) LIGHT HAVING A FLY KILLING FUNCTION

(71) Applicants: Jian Zhang, Jiangsu (CN); Robert Bruce Cameron, Buckeye, AZ (US)

(72) Inventors: Jian Zhang, Jiangsu (CN); Robert Bruce Cameron, Buckeye, AZ (US)

(*) Notice: Subject to any disclaimer, the term of this patent is extended or adjusted under 35 U.S.C. 154(b) by 697 days.

(21) Appl. No.: 15/392,306

(22) Filed: Dec. 28, 2016

(65) Prior Publication Data

US 2018/0116195 A1 May 3, 2018

(30) Foreign Application Priority Data

Nov. 3, 2016 (CN) .......................... 2016 1 0952015

(51) Int. Cl.
*A01M 1/00* (2006.01)
*A01M 1/04* (2006.01)
(Continued)

(52) U.S. Cl.
CPC ............... *A01M 1/08* (2013.01); *A01M 1/00* (2013.01); *A01M 1/04* (2013.01); *A01M 1/06* (2013.01);
(Continued)

(58) Field of Classification Search
CPC A01M 1/00; A01M 1/02; A01M 1/04; A01M 1/06; A01M 1/08; A01M 1/10; A01M 1/106
(Continued)

(56) References Cited

U.S. PATENT DOCUMENTS 1,527,976 A * 3/1925 Haugart ................. A01M 1/223
43/113
1,962,420 A * 6/1934 Bradley ................. A01M 1/04
43/112
(Continued)

FOREIGN PATENT DOCUMENTS

CN 201230527 Y 5/2009
CN 201270731 Y 7/2009
CN 203136859 U 8/2013

*Primary Examiner* — Darren W Ark
*Assistant Examiner* — Steven J Shur
(74) *Attorney, Agent, or Firm* — Bycer Law, PLC; Matthew L. Bycer

(57) ABSTRACT

A light, in particular, a light having a fly killing function that can be used for lighting and killing flies including at least one LED chip, a fly storage means, a negative pressure fan, a fan hanger, a ventilation net, a power supply; wherein the fly storage means is connected to the fan hanger, the LED chip is secured to an lower end of the fly storage means, the fly storage means including an air inlet and a fly storage groove, the negative pressure fan is mounted onto the fan hanger above the fly storage means, a gap is provided between the blades of the negative pressure fan and an upper end of the fly storage means to allow flies to go through; the ventilation net includes a plurality of ventilation holes having a size that is able to stop flies from passing therethrough, and the ventilation net is provided circumferentially between the outside wall of the fan hanger and the outside wall of the fly storage means, and the fan hanger, the ventilation net and the fly storage means form a substantially closed space except the ventilation holes and the air inlet.

20 Claims, 5 Drawing Sheets

(51) Int. Cl.
  *A01M 1/06* (2006.01)
  *A01M 1/08* (2006.01)
  *A01M 1/10* (2006.01)
  *F21K 9/237* (2016.01)
  *F21V 33/00* (2006.01)
  *F21K 9/232* (2016.01)
  *F04D 17/16* (2006.01)
  *F04D 19/00* (2006.01)
  *F04D 29/64* (2006.01)
  *F04D 29/70* (2006.01)
  *F21V 3/02* (2006.01)
  *F21V 19/00* (2006.01)
  *F21V 23/00* (2015.01)
  *F21Y 103/33* (2016.01)
  *F21Y 115/10* (2016.01)

(52) U.S. Cl.
  CPC .............. *A01M 1/10* (2013.01); *A01M 1/106* (2013.01); *F04D 17/16* (2013.01); *F04D 19/002* (2013.01); *F04D 29/644* (2013.01); *F04D 29/703* (2013.01); *F21K 9/232* (2016.08); *F21K 9/237* (2016.08); *F21V 3/02* (2013.01); *F21V 19/005* (2013.01); *F21V 23/001* (2013.01); *F21V 33/00* (2013.01); *A01M 2200/012* (2013.01); *F21Y 2103/33* (2016.08); *F21Y 2115/10* (2016.08); *Y02A 50/30* (2018.01)

(58) Field of Classification Search
  USPC ............................................ 43/113, 139, 107
  See application file for complete search history.

(56) References Cited

U.S. PATENT DOCUMENTS

| | | | | |
|---|---|---|---|---|
| 2,132,371 | A * | 10/1938 | Kriwat | A01M 1/223 43/112 |
| 2,608,022 | A * | 8/1952 | Wright | A01M 1/04 43/112 |
| 2,674,682 | A * | 4/1954 | Hanson | A01M 1/04 219/473 |
| 4,873,786 | A * | 10/1989 | Franco | A01M 1/04 43/112 |
| 4,951,414 | A * | 8/1990 | Mewissen | A01M 1/04 43/112 |
| 7,036,269 | B1 * | 5/2006 | Chen | A01M 1/08 43/113 |
| D583,008 | S * | 12/2008 | Vranesh | D22/123 |
| 9,968,080 | B1 * | 5/2018 | Van Kleef | F21K 9/23 |
| D821,537 | S * | 6/2018 | Ye | D22/123 |
| 10,045,521 | B2 * | 8/2018 | Zheng | F21V 23/005 |
| 10,337,675 | B2 * | 7/2019 | Van Kleef | A01M 1/145 |
| 10,412,953 | B2 * | 9/2019 | Van Kleef | F21V 23/06 |
| 10,701,924 | B2 * | 7/2020 | Zheng | A01M 1/023 |
| 2008/0236028 | A1 * | 10/2008 | McBride | A01M 1/023 43/139 |
| 2014/0352200 | A1 * | 12/2014 | Tremble | A01M 1/223 43/112 |
| 2017/0367314 | A1 * | 12/2017 | Billingsley, Jr. | A01M 1/223 |
| 2018/0035657 | A1 * | 2/2018 | Ots | A01M 1/04 |
| 2018/0116195 | A1 * | 5/2018 | Zhang | F21V 3/02 |
| 2018/0199563 | A1 * | 7/2018 | Zheng | A01M 1/106 |
| 2020/0107534 | A1 * | 4/2020 | Zheng | F21V 33/00 |

* cited by examiner

LIGHT HAVING A FLY KILLING FUNCTION

FIELD OF THE INVENTION

The present invention relates to a light. More specifically, the present invention relates to a light having a fly killing function that can be used for both lighting and killing flies.

TECHNICAL BACKGROUND OF THE INVENTION

Fly killing lamp is generally an effective black light fly killing device which takes advantage of behaviors of flies, such asphotokinesis, moving with air flow, sensitive to temperature, gregariousness, especially the behavior of chasing carbon dioxide wind and sex pheromone. The fly killing lamp typically does not use any fly killing chemicals, and thus is an environmentally friendly and pollution-free way of killing flies.

Chinese Patent CN 201270731 Y discloses a photocatalysis fly killer comprising a shell having an upper opening, a fan fixed at the upper opening of the shell by a fixing holder, a ventilation filter screen provided at the side surface of the lower section of the shell; a titanium oxide coated plate is fixed above the shell by vertical posts; and a zapper lamp is provided above the titanium oxide coated plate and at the side of the coating layer. With the zapper lamp and the photocatalysis generated by a photocatalyst, the photocatalysis mosquito killer can simulate the situation of a human exhaling wet carbon dioxide wind, so as to induce flies to approach and draw them into the shell by a strong airflow generated by the fan, and then the flies are air-dried and dehydrated to death. This patent can be used merely as a fly-killing device, and a titanium oxide coated plate is required, which results in a complex structure.

Chinese Patent CN 201230527 Y discloses a fly killer which comprises a shell, a top cover, an ultraviolet tube, an air inlet, a fan, a fan support and a fly storage means, wherein the air inlet is disposed between the top cover and the shell, the ultraviolet tube is disposed in the air inlet under the top cover, the fan is disposed in the shell under the air inlet and provided on the fan support, and the fly storage means is disposed under the fan support. The fan is a centrifugal fan. When the fan blades rotate, the airflow produced by the centrifugal fan is dispersed all around in the form of a vortex, and a vacuum is formed in the middle thereof, so that supplemental air from outside flows inside quickly. When air flows inside, flies are trapped, thereby achieving the effect of fly killing. This patent uses an ultraviolet tube and cannot be used as a light.

Chinese patent CN 203136859 U discloses a fly killer wherein an anti-fly escape plate is provided at the top opening of a fly storage box, and a funnel structure is formed downward from the center of the anti-fly escape plate; the funnel structure is formed by a plurality of arc-shaped bodies, and the cross section of each arc-shaped body is in the shape of a triangle with a wide bottom and a pointed top; a ventilation hole is formed between each two adjacent arc-shaped bodies. Additionally, a light emitting device and a negative pressure fan are provided above the anti-fly escape plate. When the fly killer is in use, the light emitting device emits light, and the negative pressure fan generates a suction force, so that flies approach the fly killer and are sucked inside the killer, and fall within the fly storage box due to the anti-fly escape plate and then dried to death. Since each ventilation hole are formed between two arc-shaped bodies, and the wind resistance of the arc-shaped bodies are small, the air flow generated by the negative pressure fan can flow smoothly to generate a proper suction force, thereby improving the fly killing effect. This utility model relates primarily to a design and structure of the anti-fly escape plate, and can be used merely as a fly killer.

Fly killers which are of different designs and structures, safe, highly effective and environmentally friendly are still needed in the art. In particular, a lighting device that can be used as a light and also has a fly killing function is extremely needed in the art.

SUMMARY OF THE INVENTION

It is an objective of the present invention to provide a light having a fly killing function. The light having a fly killing function comprises at least one LED chip, a fly storage means, a negative pressure fan, a fan hanger, a ventilation net, a power supply; wherein the fly storage means is connected to the fan hanger, the LED chip is secured to a lower end surface of the fly storage means, the fly storage means comprises an air inlet and a fly storage groove, the negative pressure fan is mounted onto the fan hanger above the fly storage means, a gap is provided between the blades of the negative pressure fan and an upper end of the fly storage means to allow flies to go through; the ventilation net comprises a plurality of ventilation holes having a size that is able to stop flies from passing therethrough, and the ventilation net is provided circumferentially between the outside wall of the fan hanger and the outside wall of the fly storage means, and the fan hanger, the ventilation net and the fly storage means form a closed space except for the ventilation holes and the air inlet.

Since flies are photokenitic, they will aggregate near the LED chip when the LED chip is powered on and emits light, and be sucked into the closed space formed by the fan hanger, the ventilation net and the fly storage means via the gap provided between the blades of the negative pressure fan and the upper end of the fly storage means by the rotating negative pressure fan when powered on. Due to the act of the negative pressure fan, the flies would not be able to fly outside of the air inlet after they are trapped. Furthermore, since the size of the ventilation holes in the ventilation net can stop the flies from passing therethrough, the flies would not be able to fly outside the closed space, and finally fall into the fly storage groove of the fly storage means, and air dried to death.

The light having fly killing function of the present invention may be used just for lighting when the negative pressure fan is not powered on and rotates.

In a particular embodiment, the light having a fly killing function is provided with a transparent light cover that cooperates with the shape of the lower end of the fly storage means and secured to the lower end of the fly storage means, and the light cover comprises a light cover air inlet which is aligned with, and in fluid communication with the air inlet of the fly storage means.

In a particular embodiment, the fly storage means and the fan hanger are connected together by means of insertion, wherein the fan hanger comprises an insertion head extending downward, and the fly storage means comprises an insertion socket capable of being engaged with the insertion head. Alternatively, the fly storage means may comprise an insertion head extending upward, and the fan hanger comprises an insertion socket capable of being engaged with the insertion head.

In a preferred embodiment, a fastening screw is used to secure the insertion head and the insertion socket together.

In a further preferred embodiment, the insertion head is a portion of a cylinder having a thickness and a length, and the ventilation net is provided outside of the insertion head abutting against the same, and is rotatable with respect to the insertion head; the ventilation net comprises a window opening for observing and removing flies from the fly storage means, and the window opening is completely covered by the insertion head when the light having a fly killing function is in the working state.

In a preferred embodiment, the insertion head is provided with a hole for power lines supplying power to the LED chip to pass through.

In a particular embodiment, a circuit board for controlling the LED chip and the negative pressure fan is provided above the fan hanger.

In a particular embodiment, a circuit board cover shell is further provided, and the circuit board cover shell, the circuit board and the fan hanger are secured together by a fastening screw.

In a particular embodiment, a speed control rod for changing speed of the negative pressure fan extends from the circuit board to outside of the circuit board cover shell to facilitate manual adjustment of the speed of the negative pressure fan.

In a particular embodiment, a light head is provided on the circuit board cover shell, and the lamp head comprises a male screw on the outer wall thereof that can be rotated into a light socket for supplying power.

The light having a fly killing function of the present invention can be used just for lighting when killing flies is not required. Where fly killing is required, the negative pressure fan can be put into operation to force flies into the fly storage means and then the flies can be air dried to death in the fly storage groove. Furthermore, the generally closed light of the present invention comprising the light cover, the circuit board, the circuit board cover shell and the light head with male screw can, as a whole, can be detachably mounted into a regular light socket. Therefore, it is safe and easy to install and remove.

DETAILED DESCRIPTION OF THE INVENTION

Figure 1:
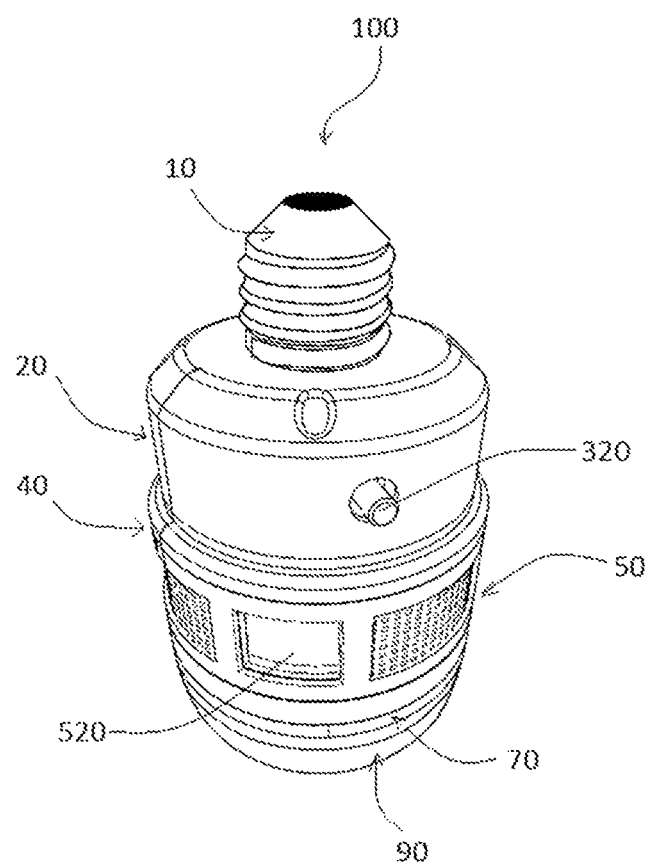
FIG. 1 is a schematic perspective view of the light having a fly killing function of the present invention.

The present invention will be further described by referring to the accompanying drawings. It should be understood that the embodiments illustrated in the drawings are for description of the invention only and shall not be construed as any limitation to the present invention. The scope of the invention would rather be defined by the appended claims.

It should be understood that the accompanying drawings are merely used to illustrate the present invention, and not necessarily drawn in scale.

It should also be understood that the directional terms such as "above", "under", "left", "right", "front", "rear", "bottom", or "top", or the like that may be used herein are merely for the ease of describing the present invention, and they should not be construed as limitations to the present invention in any way.

For brevity, reference numbers are not provided for all the parts, components or features shown in some of the figures. Thus, a cross reference to all of the drawings should be made when reading the detailed description below to obtain a clear and complete understanding of the present invention.

Referring to FIGS. 1, 2, 3, 4 and 5, a light 100 having a fly killing function of the present invention is shown. The basic concept of the invention is to provide a device that can be used as a light and can kill flies. Therefore, although a preferred embodiment of the present invention is illustrated in FIGS. 1-5, the present invention is not limited thereto. In order to carry out the basic concept of the present invention, the light 100 having a fly killing function illustrated herein comprises at least a LED chip 80, a fly storage means 70, a negative pressure fan 60, a fan hanger 40, a ventilation net 50, and a powers source. The LED chip 80 may be welded to a circuit board (not shown), such as an aluminum circuit board, and then the circuit board is secured to the lower end surface of the fly storage means 70. The LED chip 80 is coupled to the power source via the circuit board. The fly storage means 70 comprises an air inlet 730 and a fly storage groove 710 that is separated from the air inlet 730. The negative pressure fan 60 is mounted to the fan hanger 40 above the air inlet 730, and preferably, is extended a depth into the air inlet 730. A gap 65 that allows flies to pass therethrough is provided between the blades of the negative pressure fan 60 and the upper end of the fly storage means. The ventilation net 50 is provided with a plurality of ventilation holes 510 having a size capable of stopping flies from passing therethrough. The ventilation net is provided circumferentially between the outside wall 401 of the fan hanger 40 and the outside wall 701 of the fly storage means 70, with the fly storage means 70 being connected to the fan hanger 40. The fan hanger 40, the ventilation net 50 and the fly storage means 70 form a substantially closed space except the ventilation holes 510 and the air inlet 730.

Since flies are photokinetic, once the LED chip is supplied with power and emits light, flies will aggregate around the LED chip 80, and sucked by the powered-on, rotating negative pressure fan 60 into the closed space except the ventilation holes 510 and the air inlet 730 formed by the fan hanger 40, the ventilation net 50 and the fly storage means 70 via the air inlet 730 of the fly storage means and the gap 65 formed between the blades of the negative pressure fan 60 and the upper end of the fly storage means 70. Due to the act of the negative pressure fan 60, the flies would not be able to fly backward out of the air inlet 730. Additionally, since the size of the ventilation holes 510 of the ventilation net 50 is capable of stopping the flies from passing therethrough, the flies would not be able to fly out of the closed space, and finally would fall within the fly storage groove 710 of the fly storage means, and air-dried to death.

Preferably, the LED chip 80 is a LED chip that is suitable for illumination and has strong attraction with respect to flies, and the selection of such a LED chip would be readily made by those skilled in the art.

For achieving uniform luminance, in a preferred embodiment, a plurality of LED chips are provided evenly on the lower ring shaped end surface of the fly storage means 70.

The air inlet 730 is a passage running through the entire fly storage means 70. Preferably, the air inlet is in the shape of a bell, i.e., the air inlet has an increasing cross section at the end approaching the negative pressure fan 60. Additionally, the negative pressure fan 60 and the blades thereof are designed and installed in a way such that the blades extend a depth into the air inlet 730, and the shapes of the blades are fitted with the bell-shaped air inlet 730. This design can obtain a much stronger suction and facilitate trapping of flies in the fly storage means 70 via the air inlet 730 and the gap 65 formed between the blades of the negative pressure fan 60 and the upper end of the fly storage means 70.

The ventilation net 50 is provided between the upper end of the side wall 701 of the fly storage means 70 and the lower end of the side wall 401 of the fan hanger 40. Particular ways of achieving this arrangement can be readily selected by those skilled in the art, and details for such particular ways will not be described herein for brevity.

The ventilation net 50 is provided with a plurality of ventilation holes for discharging the air sucked by the negative pressure fan 60 out of the light having a fly killing function of the present invention. The ventilation holes 510 are preferably provided evenly in the entire ventilation net 50 so that the air can be discharged evenly, thereby reducing the noise. The size of the ventilation holes 510 should ensure that the flies trapped in the closed space would not be able to pass therethrough and escape. In a preferred embodiment, the ventilation holes 510 may be in the shape of a bell with the cross section thereof becoming increasingly larger from inside to outside, thereby further facilitating discharge of the air and reducing the noise of the air flow.

In a particular embodiment, the light 100 having a fly killing function of the present invention further comprises a transparent light cover 90 having a shape matching with the shape of the lower end of the fly storage means 70, and the transparent light cover 90 is secured to the lower end of the fly storage means 70. The transparent light cover 90 includes a light cover air inlet 930 that is in fluid communication with the air inlet 730 of the fly storage means 70. The transparent light cover 90 may be secured, such as by an adhesive, to the lower end of the fly storage means 70.

Figure 2:
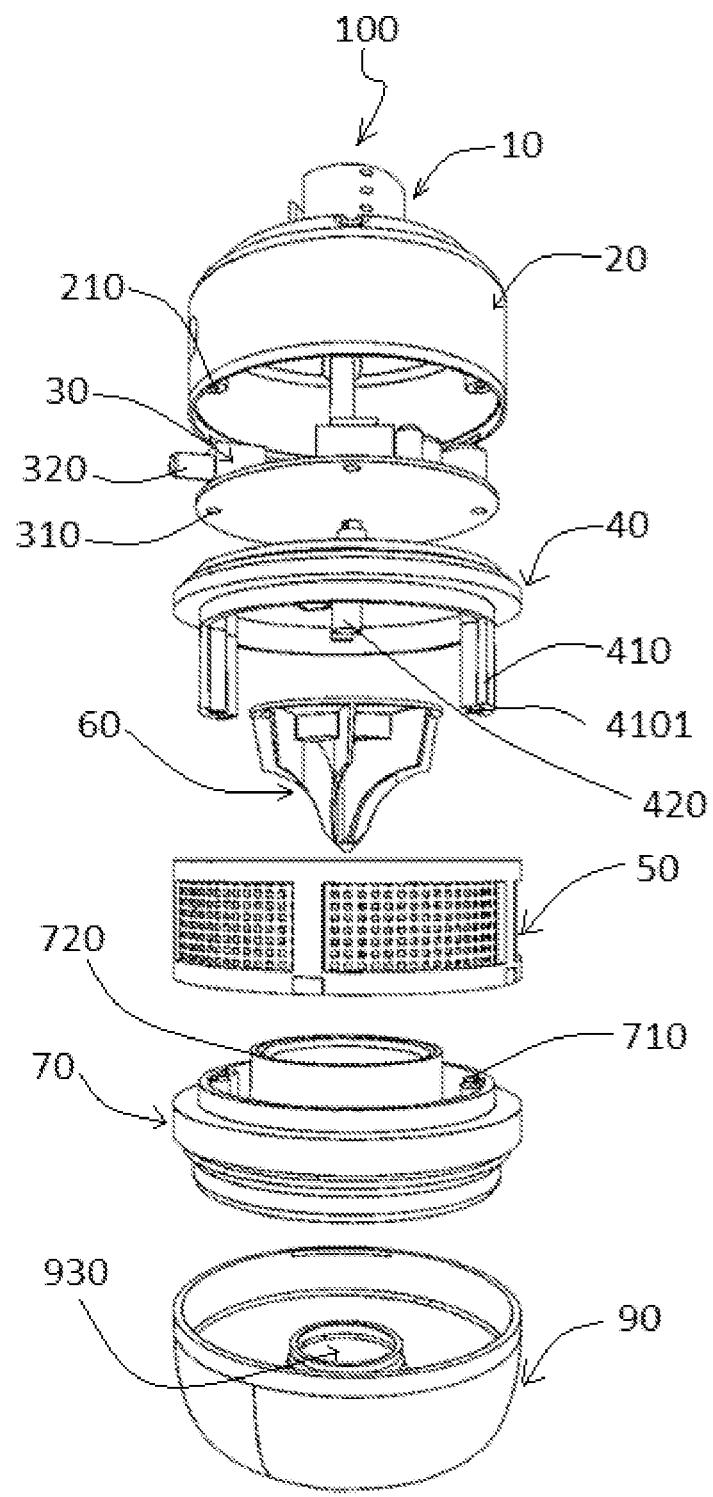
FIG. 2 is a schematic exploded view of the light having a fly killing function of FIG. 1.
Figure 3:
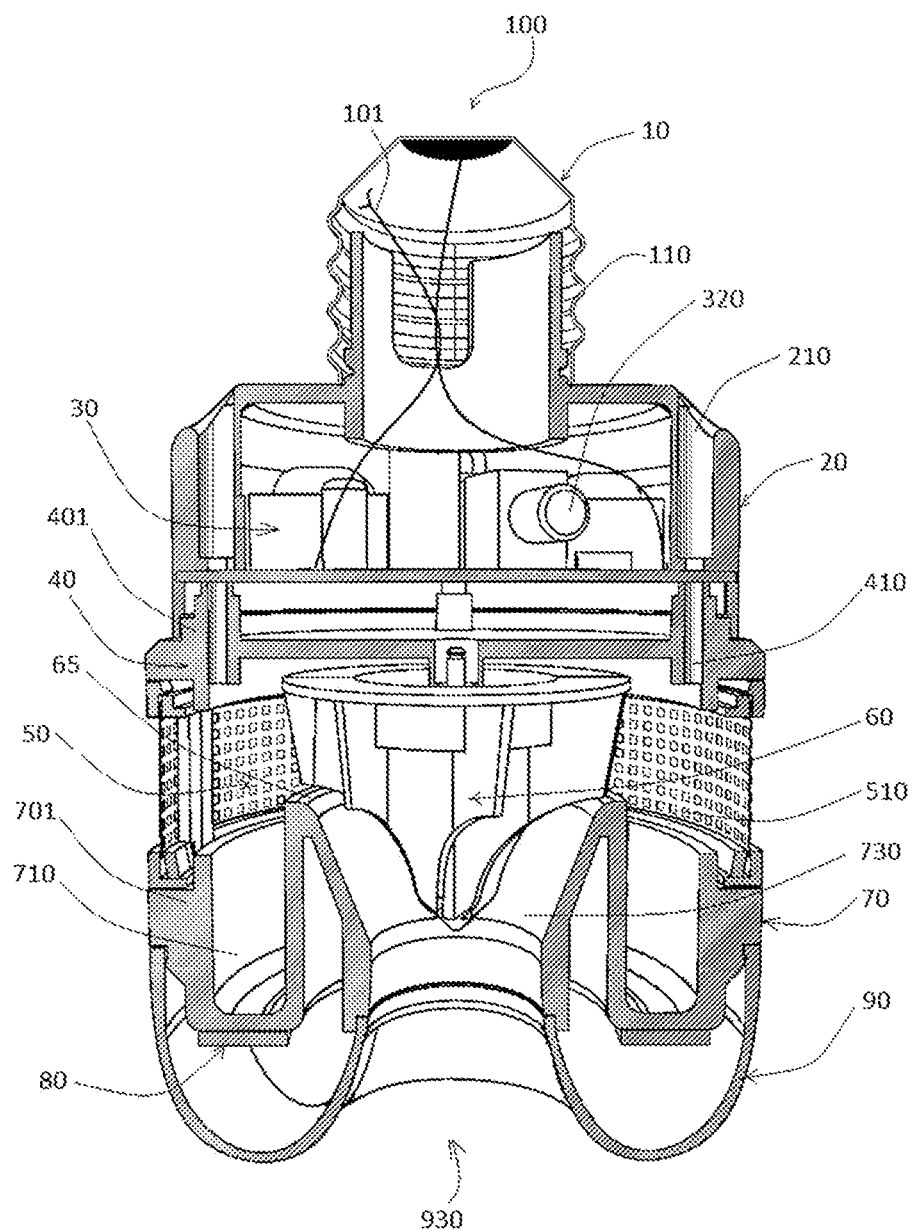
FIG. 3 is a longitudinal cross-sectional view of the light having a fly killing function of FIG. 1, wherein the negative pressure fan is not cut.
Figure 4:
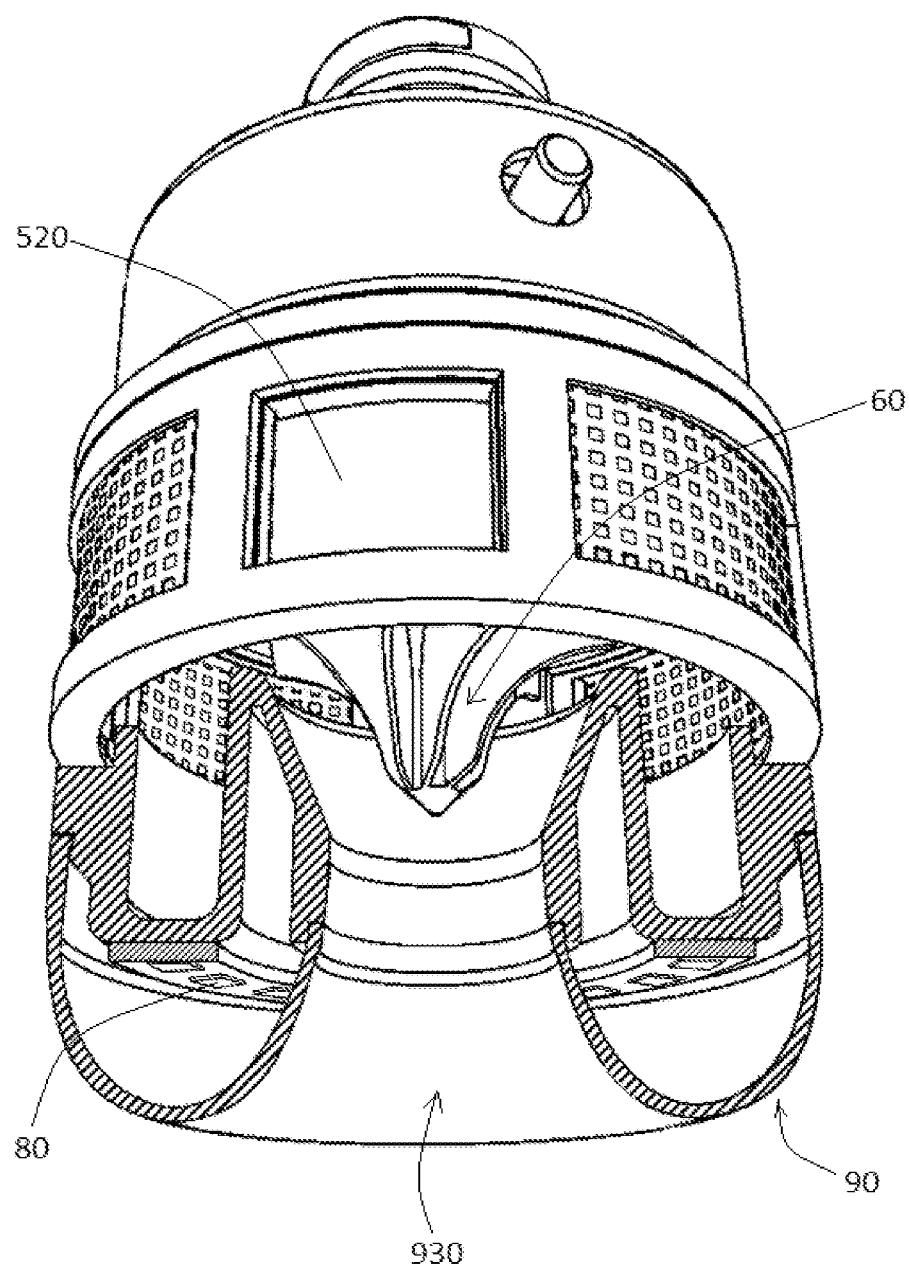
FIG. 4 is a local cross-sectional view of the light having a fly killing function of FIG. 1.
Figure 5:
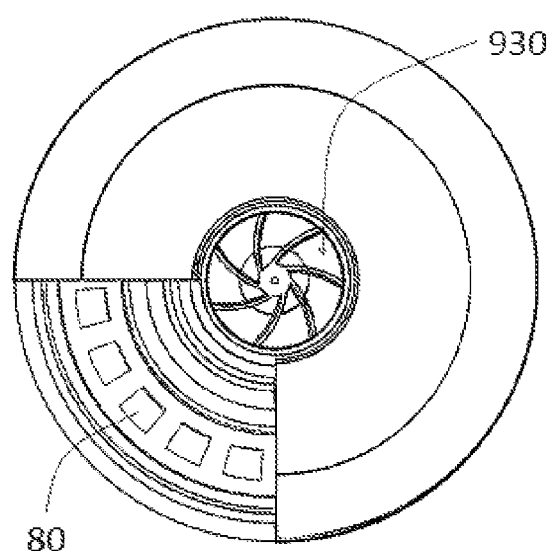
FIG. 5 is a bottom view of the light having a fly killing function of FIG. 1, wherein a portion of the lamp cover is cut away.

Referring to FIG. 2, in a particular embodiment, the fly storage means 70 is connected with the fan hanger 40 by means of insertion, with the fan hanger including an insertion head 410 extending downward, and the fly storage means 70 including a socket 710 which engages with the insertion head 410. Of course, alternatively, the fly storage means 70 may include an insertion head extending upward, and the fan hanger 40 includes a socket which engages with the insertion head. Furthermore, the insertion head may be provided with a screw hole (not shown), and a fastening screw can be used to fasten the insertion head and the socket together.

Preferably, the insertion head 410 is a portion of a cylinder having a thickness and a length, and the ventilation net 50 is installed abutting against the external side of the insertion head 410 and can rotate with respect to the same. The ventilation net 50 comprises a window opening 520 (see FIG. 4), which will be covered completely by the insertion head 410 when the light 100 having a fly killing function is in the working state, so as to form a closed space. When the light 100 having a fly killing function is in the non-working state, the ventilation net 50 may be rotated so that the window opening 520 goes away from the insertion head 410 so that the interior of the light 100 having a fly killing function is viewable through the window opening 520, and if required, the flies trapped and air-dried in the fly storage groove 710 can be removed via the window opening 520.

In a preferred embodiment, the insertion head 410 is provided with a through hole 410 for power lines (not shown) supplying power to the LED chips to pass through.

In a preferred embodiment, a circuit board 30 for controlling the LED chips and the negative pressure fan may be further provided above the fan hanger 40. The circuit board 30 may be designed and manufactured as required, and the design and manufacture of the same are known, or at least readily achieved by those skilled in the art.

Accordingly, the light 100 having a fly killing function of the present invention further comprises a circuit board cover 20. The circuit board cover 20, the circuit board 30 and the fan hanger 40 may be provided respectively with screw holes 210, 310 and 410 that a fastening screw (not shown) may be driven therethrough to fasten them together.

Preferably, the negative pressure fan 60 may be configured to be speed variable through the circuit board 30, such as a negative pressure fan speed adjusting rod 320 may be provided on the circuit board 30 and extends outside of the circuit board cover 20 from the circuit board 30 to facilitate manual adjustment of the speed of the negative pressure fan 60.

Preferably, a light head 10 is provided at the top of the circuit board cover shell 20. The light head 10 may comprise a male screw 110 on the outside wall thereof which can be rotated into a socket (not shown) for supplying power. This case is similar to the conventional connection of a bulb with a bulb socket, and thus it will not be described in detail. The power lines 101 are coupled to the circuit board 30 so as to supply power thereto.

Parts or components of the light having a fly killing function of the present invention may be formed of any suitable materials, such as for example, the circuit board, the fan hanger and the ventilation net may be formed of nylon, the negative pressure fan may be formed of polybutylene tertephehalate (PBT), and the fly storage means may be formed of an aluminum oxide ceramic. The present invention is not limited to such materials.

Although the shape of the light having a fly killing function of the present invention is illustrated as generally cylindrical, it is not intended to be limited thereto. The light having fly killing function of the present invention may also be in the shape of an elliptic cylinder, a square column, or any other polygon column.

It should be understood that the embodiments described above are not intended to limit the scope of the present invention, but rather exemplary embodiments for implementing the present invention.

Having described the preferred embodiments of the invention, it is understood that the invention defined by the appended claims is not to be limited by particular details set forth in the above description, as many apparent variations thereof are possible without departing from the spirit or scope thereof.

What is claimed is:

1. A light having a fly killing function, comprising:
a cover provided at the top of the male coupler head; and
a light head extending from the cover, wherein the light head comprises a male screw on an outer wall thereof that can be rotated into a light socket for supplying power at least one LED light source secured to a lower end of a fly storage compartment; the fly storage compartment comprises an air inlet and a fly storage groove; the fly storage compartment connected to a fan hanger; a negative pressure fan mounted onto the fan hanger above the fly storage compartment; a cylindrical ventilation net comprising a plurality of ventilation holes, the net set between an outside wall of the fan hanger and an outside wall of the fly storage compartment; a cover provided at the top of the male; a cover provided above the negative pressure fan mounted onto the fan hanger; and a light head extending from the cover, wherein the light head comprises a male screw on an outer wall thereof that can be rotated into a tight socket for supplying power, and wherein a gap is provided between the negative pressure fan and an upper end of the fly storage compartment.

2. The light according to claim 1 wherein the light head is rotatable about an axis, and the ventilation net is rotatable around the axis, the net further comprising a window opening.

3. A light having a fly killing function, comprising:
at least one LED light source secured to a lower end of a fly storage compartment; the fly storage compartment comprises an air inlet and a fly storage groove; the fly storage compartment connected to a fan hanger; a negative pressure fan mounted onto the fan hanger above the fly storage compartment; a cylindrical ventilation net comprising a plurality of ventilation holes, the net set between an outside wall of the fan hanger and an outside wall of the fly storage compartment; a transparent light cover comprising a central aperture coupled and in fluid communication with said air inlet; a cover provided above the negative pressure fan mounted onto the fan hanger; and a light head extending from the cover, wherein the light head comprises a male screw on an outer wall thereof that can be rotated into a light socket for supplying power, and wherein a gap is provided between the negative pressure fan and an upper end of the fly storage compartment.

4. The light according to claim 3 wherein said air inlet is bell-shaped with an increasing cross section at the upper end of the fly storage compartment approaching the negative pressure fan.

5. The light according to claim 4 wherein said fan comprises blades extending into said air inlet.

6. A light having a fly killing function, comprising: an LED chip, a fly storage means, a negative pressure fan, a fan hanger, a ventilation net, and a power supply; wherein the fly storage means is connected to the fan hanger, the LED chip is secured to a lower end of the fly storage means, the fly storage means comprises an air inlet and a fly storage groove, the negative pressure fan is mounted onto the fan hanger above the fly storage means, a gap is provided between blades of the negative pressure fan and an upper end of the fly storage means to allow flies to go through; the ventilation net comprises a plurality of ventilation holes having a size that is able to stop flies from passing therethrough, and the ventilation net is provided circumferentially between an outside wall of the fan hanger and an outside wall of the fly storage means, and the fan hanger, the ventilation net and the fly storage means form a substantially closed space except for the ventilation holes and the air inlet; a circuit board for controlling the LED chip and the negative pressure fan; a circuit board cover shell; the circuit board cover shell, the circuit board and the fan hanger are secured together; and a light head provided at a top end of the circuit board cover shell, wherein the light head comprises a male screw on an outer wall thereof that can be rotated into a light socket for supplying power.

7. The light having a fly killing function according to claim 6, wherein the light having a fly killing function is provided with a transparent light cover that cooperates with a a shape of the lower end of the fly storage means and is secured to the lower end of the fly storage means, and the transparent light cover comprises a light cover air inlet which is aligned with, and in fluid communication with the air inlet of the fly storage means.

8. The light having a fly killing function according to claim 7, wherein the fly storage means and the fan hanger are connected together by means of insertion, wherein the fan hanger comprises an insertion head extending downward, and the fly storage means comprises an insertion socket capable of being engaged with the insertion head.

9. The light having a fly killing function according to claim 7, wherein the fly storage means and the fan hanger are connected together by means of insertion, wherein the fly storage means comprises an insertion head extending upward, and the fan hanger comprises an insertion socket capable of being engaged with the insertion head.

10. The light having a fly killing function according to claim 8, wherein a fastening screw is used to secure the insertion head and the insertion socket together.

11. The light having a fly killing function according to claim 8, wherein the insertion head is a portion of a cylinder having a thickness and a length, and the ventilation net is installed outside of the insertion head abutting against the same, and is rotatable with respect to the insertion head; the ventilation net comprises a window opening, and the window opening along a circumferential edge of the insertion head and is completely covered by the insertion head when the fly killing light is in a working state.

12. The light having a fly killing function according to claim 11, wherein the insertion head is provided with a hole for power lines supplying power to the LED chip to pass through.

13. The light having a fly killing function according to claim 12, wherein the circuit board for controlling the LED chip and the negative pressure fan is provided above the fan hanger.

14. The light having a fly killing function according to claim 13, wherein the circuit board cover shell, the circuit board and the fan hanger are secured together by a fastening screw; a speed control rod for changing speed of the negative pressure fan extends from the circuit board to outside of the circuit board cover shell to facilitate manual adjustment of the speed of the negative pressure fan.

15. The light having a fly killing function according to claim 9, wherein a fastening screw is used to secure the insertion head and the insertion socket together.

16. The light having a fly killing function according to claim 9, wherein the insertion head is a portion of a cylinder having a thickness and a length, and the ventilation net is installed outside of the insertion head abutting against the same, and is rotatable a with respect to the insertion head; the ventilation net comprises a window opening along a circumferential edge of the insertion head and, and the window opening is completely covered by the insertion head when the fly killing light is in a working state.

17. The light having a fly killing function according to claim 16, wherein the insertion head is provided with a hole for power lines supplying power to the LED chip to pass through.

18. The light having a fly killing function according to claim 17, wherein the circuit board for controlling the LED chip and the negative pressure fan is provided above the fan hanger.

19. The light having a fly killing function according to claim 18, wherein the circuit board cover shell, the circuit board and the fan hanger are secured together by a fastening screw; a speed control rod for changing speed of the negative pressure fan extends from the circuit board to outside of the circuit board cover shell to facilitate manual adjustment of the speed of the negative pressure fan.

20. The light having a fly killing function according to claim 6, wherein the air inlet is partially formed by a passage through the fly storage means.

* * * * *